United States Patent
De Lavarene et al.

(10) Patent No.: US 11,394,794 B2
(45) Date of Patent: Jul. 19, 2022

(54) FAST INGESTION OF RECORDS IN A DATABASE USING DATA LOCALITY AND QUEUING

(71) Applicant: Oracle International Corporation, Redwood Shores, CA (US)

(72) Inventors: Jean De Lavarene, Versailles (FR); Chandra Sekhar Krishna Mahidhara, Bangalore (IN); Pablo Silberkasten, Redwood City, CA (US); Michael McMahon, San Francisco, CA (US); Ilesh Garish, Pleasanton, CA (US); Aramvalarthanathan Namachivayam, Bangalore (IN); Saurabh Kumar Verma, Bangalore (IN); Ilya Taranov, Dublin, CA (US)

(73) Assignee: Oracle International Corporation

( * ) Notice: Subject to any disclaimer, the term of this patent is extended or adjusted under 35 U.S.C. 154(b) by 322 days.

(21) Appl. No.: 16/656,486

(22) Filed: Oct. 17, 2019

(65) Prior Publication Data
US 2020/0128094 A1    Apr. 23, 2020

Related U.S. Application Data

(60) Provisional application No. 62/747,567, filed on Oct. 18, 2018.

(51) Int. Cl.
| | | |
|---|---|---|
| G06F 17/30 | (2006.01) | |
| H04L 67/566 | (2022.01) | |
| H04L 67/568 | (2022.01) | |
| G06F 16/22 | (2019.01) | |
| G06F 16/23 | (2019.01) | |

(Continued)

(52) U.S. Cl.
CPC .......... H04L 67/2833 (2013.01); G06F 9/546 (2013.01); G06F 16/2282 (2019.01); G06F 16/2386 (2019.01); H04L 67/2842 (2013.01); G06F 16/284 (2019.01)

(58) Field of Classification Search
CPC ........ G06F 16/13; G06F 16/24; G06F 16/156; G06F 16/1865; G06N 3/00; G06N 5/00; G05B 13/00
See application file for complete search history.

(56) References Cited

U.S. PATENT DOCUMENTS

| | | | | |
|---|---|---|---|---|
| 7,272,600 B1 * | 9/2007 | Singh | ..................... | G06F 16/214 |
| 11,250,056 B1 * | 2/2022 | Batsakis | ............... | G06F 16/901 |

(Continued)

OTHER PUBLICATIONS

"Scaling Out Data Ingestion," CitusData, Date found via Google as Jul. 30, 2017, URL: https://docs.citusdata.com/en/v7.0/performance/scaling_data_ingestion.html.

(Continued)

*Primary Examiner* — Hung D Le
(74) *Attorney, Agent, or Firm* — Vista IP Law Group, LLP

(57) ABSTRACT

Described is a system, method, and computer program product is provided that implements high-volume data ingestion in a relational database system. A middle-tier structure is provided that sits between the IoT data producers and the back-end database system. Data records are gathered together and organized at the middle tier, and groups of those records are ingested on a group-basis into the database in a manner which bypasses standard SQL engine processing.

27 Claims, 6 Drawing Sheets

(51) Int. Cl.
   *G06F 9/54*    (2006.01)
   *G06F 16/28*   (2019.01)

(56) References Cited

U.S. PATENT DOCUMENTS

| | | | | |
|---|---|---|---|---|
| 2005/0050074 | A1* | 3/2005 | Jain | G06F 16/24552 |
| 2016/0020917 | A1* | 1/2016 | Tuatini | H04L 41/026 |
| | | | | 709/206 |
| 2016/0092484 | A1* | 3/2016 | Finkler | G06F 16/258 |
| | | | | 707/715 |
| 2016/0307173 | A1* | 10/2016 | Chauhan | G06F 16/901 |
| 2016/0321308 | A1* | 11/2016 | Brinnand | G06F 16/951 |
| 2017/0052652 | A1* | 2/2017 | Denton | G06F 16/9535 |
| 2018/0005274 | A1* | 1/2018 | Calvillo | G06F 16/958 |
| 2018/0349445 | A1* | 12/2018 | Ramos | G06F 16/24575 |
| 2019/0163754 | A1* | 5/2019 | Huang | G06F 16/2282 |
| 2019/0236149 | A1* | 8/2019 | Kuruvada | G06F 16/14 |

OTHER PUBLICATIONS

"Query Performance Tuning," CitusData, Date found via Google as Aug. 30, 2016, URL: https://docs.citusdata.com/en/v7.4/performance/performance_tuning.html#scaling-data-ingestion.

"IoT and Big Data," Bosch Software Innovations and MongoDB, Copyright 2019.

Ji, C., et al., "Device Data Ingestion for Industrial Big Data Platforms with a Case Study," MDPI Article, Sensors, dated 2016.

"IoT Big Data Framework Architecture," Version 1.0, dated Oct. 2016.

Mason, R., et al., "Big Data's Velocity and Variety Challenges," MuleSoft.

Navqi, S., et al., "Time Series Databases and InfluxDB," Universite libre de Bruxelles, Advanced Databases, dated Dec. 2017.

Bhat, U., "Ingestion and Processing of Data For Big Data and IoT Solutions," Hackernoon, dated Aug. 8, 2017, URL: https://hackernoon.com/ingestion-and-processing-of-data-for-big-data-and-iot-solutions-659431e37b52.

Meehan, J., et al., "Data Ingestion for the Connected World," CIDR'17 Jan. 8-11, 2017, Chaminade, CA.

Yamashita, T., "Real-time data processing with IoT Core," GoogleCloud, dated Apr. 10, 2018, URL: https://cloud.google.com/community/tutorials/cloud-iot-rtdp.

Colgan, M., "How to achieve large-scale IoT with relational databases," InfoWorld, dated Aug. 30, 2018, URL: https://www.infoworld.com/article/3301861/how-to-achieve-large-scale-iot-with-relational-databases.html.

Blair, K., "Part I: Designing Big Data Stream Ingestion Architectures Using Snowflake," Snowflake, dated Sep. 8, 2016, URL: https://www.snowflake.com/blog/designing-big-data-stream-ingestion-architectures-using-snowflake-part-1/.

Xu, Y., "Azure Data ingestion made easier with Azure Data Factory's Copy Data Tool," Microsoft Azure, dated Jun. 19, 2018, URL: https://azure.microsoft.com/en-us/blog/data-ingestion-into-azure-at-scale-made-easier-with-latest-enhancements-to-adf-copy-data-tool/.

"Best Practices For Implementing High Volume IoT workloads with Oracle Database 12c," Oracle White Paper, dated Apr. 2017.

Filguiera, R., et al., "IoT-Hub: New IoT Data-Platform for Virtual Research Environments," 10th International Workshop on Science Gateways (IWSG 2018), Jun. 13-15, 2018.

Siow, E., et al., "Analytics for the Internet of Things: A Survey," ACM Computing Surveys, vol. 1, No. 1, Article 1. Publication date: Jan. 2018.

* cited by examiner

FAST INGESTION OF RECORDS IN A DATABASE USING DATA LOCALITY AND QUEUING

CROSS-REFERENCE TO RELATED APPLICATIONS

The present application claims the benefit of priority to U.S. Provisional Application No. 62/747,567, filed on Oct. 18, 2018, which is hereby incorporated by reference in its entirety.

BACKGROUND

The Internet of Things (IoT) refers to a network of physical devices that extends to ordinary objects in an environment that is capable of being networked together and exchanging data. IoT involves extending Internet connectivity beyond standard devices (such as computers) to any or all physical devices and everyday objects. These devices can then communicate and interact over the Internet or other networks, and can then be monitored and/or controlled.

The proliferation of IoT devices brings with it the proliferation of data generated by the IoT devices. The problem is that conventional relational database systems are not capable of being sufficiently scaled to handle the sheer quantity of data that would be generated by IoT devices in their anticipated usage. For example, IoT agents (such as large numbers of temperature sensors in multiple physical warehouses) are capable of generating millions of records per second of temperature data that need to be stored into a data storage infrastructure such as a database. However, relational databases consume a non-trivial amount of resources to process ingestion of data into the database, including for example, network/roundtrip overhead to process each database update, tying up network ports, logging overhead, and SQL overhead. Therefore, when enormous quantities of updates need to be processed in a relational database for IoT data ingestion, the overhead necessary to process these enormous amounts of updates becomes an intractable problem, causing delays for the ingestion work itself as well as consuming excess resources that create domino effects of latencies for other work in the database system that may now be starved for computing resources.

Because conventional relational database management systems (RDBMS) typically cannot scale enough to handle this type of high-volume data ingestion, NoSQL stores have been proposed as the datastore to hold IoT data. A NoSQL database provides a mechanism for storage and retrieval of data that do not use the tabular relations or SQL methodology employed in relational databases. However, the disadvantage of these types of stores is that NoSQL products typically do not offer the same level of functionalities as RDBMS systems. For example, many NoSQL products do not guarantee ACID (atomicity, consistency, isolation, durability) properties for database operations performed in the system. In addition, many NoSQL products provide much lower levels of querying capabilities as compared to relational databases.

What is needed, therefore, is a method and/or system that overcomes these problems, and which more efficiently implements high-volume data ingestion in a relational database system.

SUMMARY

According to some embodiments, a system, method, and computer program product is provided that implements high-volume data ingestion in a relational database system. This is accomplished by implementing a middle-tier structure that sits between the IoT data producers and the back-end database system. Data records are gathered together and organized at the middle tier, and optimally-sized groups of those records are ingested on a group-basis into the database in a manner which bypasses standard SQL engine processing.

Other additional objects, features, and advantages of the invention are described in the detailed description, figures, and claims.

BRIEF DESCRIPTION OF FIGURES

The drawings illustrate the design and utility of some embodiments of the present invention. It should be noted that the figures are not drawn to scale and that elements of similar structures or functions are represented by like reference numerals throughout the figures. In order to better appreciate how to obtain the above-recited and other advantages and objects of various embodiments of the invention, a more detailed description of the present inventions briefly described above will be rendered by reference to specific embodiments thereof, which are illustrated in the accompanying drawings. Understanding that these drawings depict only typical embodiments of the invention and are not therefore to be considered limiting of its scope, the invention will be described and explained with additional specificity and detail through the use of the accompanying drawings in which.

DETAILED DESCRIPTION

Various embodiments will now be described in detail, which are provided as illustrative examples of the invention so as to enable those skilled in the art to practice the invention. Notably, the figures and the examples below are not meant to limit the scope of the present invention. Where certain elements of the present invention may be partially or fully implemented using known components (or methods or processes), only those portions of such known components (or methods or processes) that are necessary for an understanding of the present invention will be described, and the detailed descriptions of other portions of such known components (or methods or processes) will be omitted so as not to obscure the invention. Further, various embodiments encompass present and future known equivalents to the components referred to herein by way of illustration.

According to some embodiments, a system, method, and computer program product is provided that implements high-volume data ingestion in a relational database system.

Generally, this is accomplished by implementing a middle-tier structure that sits between the IoT data producers and the back-end database system. Rather than loading data records on a one-by-one basis directly from IoT data producers to the back-end database system, the data records are instead gathered together and organized at the middle tier, and optimally-sized groups of those records are ingested on a group-basis into the database.

Figure 1:
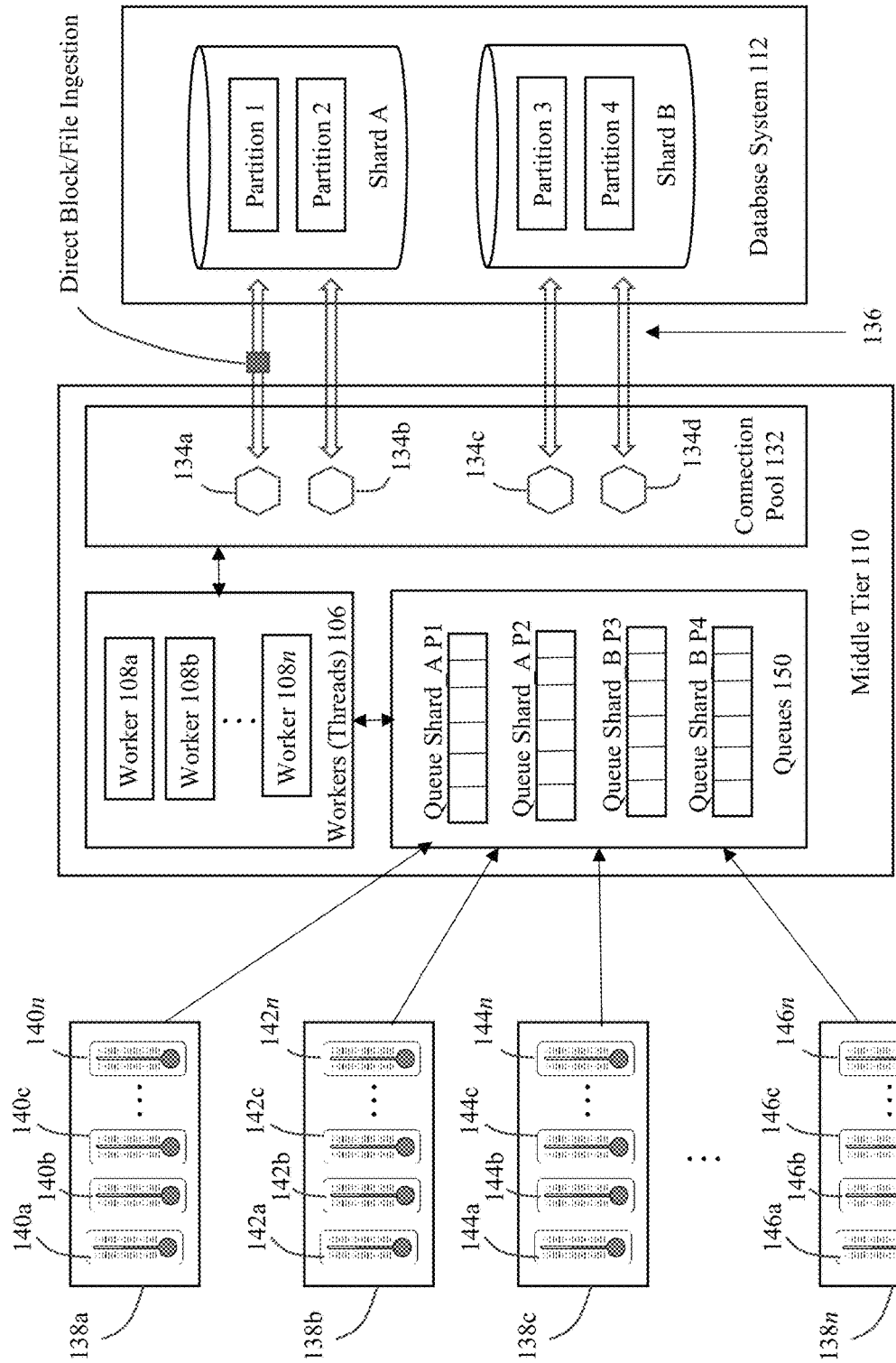
FIG. 1 illustrates a system to implement high-volume data ingestion in a relational database system according to some embodiments of the invention.

FIG. 1 illustrates an approach to implement high-volume data ingestion in a relational database system according to some embodiments of the invention. One or more data producers 138a, 138b, 138c, . . . 138n correspond to data sources generated within the system. In some embodiments, the data producers 138a-n correspond to locations and/or devices that include one or more IoT sensors that generate sensor data. For example, data producer 138a may include a plurality of sensors 140a, 140b, 140c, . . . 140n. The sensors correspond to any type of mechanism or device which can generate data readings based upon any suitable sensing functionality, such as speed, acceleration, temperature, moisture, sound, light/image/video capture, chemical detection, and/or GPS location. The sensors may include a communications component that can communicate with a data collection device. For example, the sensors may communicate using any suitable wireless communications protocol, such as using RFID protocols, ZigBee protocol, WIFI, or cellular protocols. The sensors may also be hard-wired into a data collection device.

For purposes of illustration only, and not for purposes of limitation, the example shown in the figure illustrates sensors that record temperature readings, e.g., in a warehouse or other location for which it may be desired to obtain temperature readings. The temperature sensors may be located within multiple locations of a site that is being monitored, and where it is desired to collect the sensor data and to load that sensor data into a database within a relational database system.

The data collected by the sensors may be intended for storage in a relational database system 112. In some embodiments, the database system 112 may be configured as a sharded database, which is illustrated in the figure having two example shards—Shard A and Shard B. Sharding refers to the process of breaking a large dataset into separate databases called "shards". One possible reason to shard a database is due to regulatory requirements where certain types of data are required to be stored in localized or geographically-constrained server facilities. Another possible reason is because as the size of data grows within a database (e.g., with tables containing hundreds of thousands or even millions of rows), it often becomes infeasible to efficiently process work over the entirety of that data when collected together. With sharding, since there are in effect multiple databases that operate over that data, the database system may parallelize execution of SQL commands onto different computing devices that hosts the individual shards, thereby reducing execution times by having workloads within the system operate on specific subsets of the data object on specific shards. The data within the shards may be distributed in any suitable manner on any appropriate type of computing hardware. For example, in one embodiment, the shards may be located on distributed computing devices that are physically separated from each other, e.g., on separate nodes that may be either local (on a LAN) or geographically remote from each other (on a WAN). Each shard is created as its own instance within the database system. For purposes of the present illustrative example, the data originating from the temperature sensors may be divided among multiple shards, so that some of the sensor data are assigned to Shard A while others of the sensor data are assigned to Shard B.

Within a given shard, the data may be further divided with data partitioning. For example, in the present figure, shard A includes partition 1 and partition 2, while shard B includes partition 3 and partition 4. Partitioning in a database system generally refers to the process of decomposing an object into a greater number of relatively smaller objects. Smaller objects are often easier to manage and more efficient to search than larger objects. Thus, database systems utilize partitioning to decompose objects such as tables and indexes into smaller and more manageable pieces or "partitions." A given partition scheme may described by a partition method (e.g. RANGE, LIST, or HASH), a partition key column, and a set of partition bounds or partition parameters. Several advantages exist once a data object has been partitioned. As just one example, "partition pruning" can be used to more efficiently execute a query upon a partitioned table. If a database query is issued against a table and the query contains a search term that is limited by a certain range or value corresponding to a partitioning criteria, then only partitions having the desired range or value are searched; all other partitions outside the desired range are "pruned" from the search. Compared to non-partitioned tables, partition pruning significantly reduces the volume of data that must be searched, thereby decreasing the response time and reducing the expense/overhead of responding to the query.

When the middle tier 110 receives data records from the data producers 138a-n, those data records are split into multiple portions and placed into one or more queues 150. Each queue is specific to a given shard and/or partition. This serves to group records together that should be handled as a collective set for purposes of ingestion into the database. In the current example, a separate queue is maintained for each of the partitions 1, 2, 3, and 4 within the shards A and B. Therefore, data records that should be stored within the same partition on the same shard will be placed into the same queue. However, it is noted that the queues can be implemented in various embodiments at any suitable level of granularity, e.g., where multiple partitions are assigned to a common queue.

It is noted that the scope of the invention encompasses other organizations of queues besides just the individual queues shown in the figure. For example, in an additional embodiment, instead of having just a single queue to hold data for a given partition/shard, one or more additional queues may be maintained. This is because, when a full queue is in the midst of being drained for ingestion into a database, the additional queue provides another location that can be used to load new data records intended for that same partition/shard. As another example, an alternate embodiment may be implemented by having a single reception queue for all data records for all partitions/shards (rather than multiple separate queues for each partition). From the common queue, selected records are later grouped together into subsets or batches that correspond to specific partitions for ingestion purposes.

The data records generated by the data producers may correspond to a set of defined data fields. For example, for temperature sensors, the data records may include a first field that identified the location ID, a second field that identifies a sensor ID, a third field that identifies a date/time, and a fourth field that identifies a temperature value.

These data fields for a given data item can be used to associate with a key that identifies the specific shard/partition that corresponds to that data item. For example, based upon information associated with the data item (such as a combination of sensor ID and location ID), this information can be used to resolve to a key value that corresponds to one of partitions 1, 2, 3 or 4. This aspect of mapping the data item to a specific key therefore functions to split the incoming data into the multiple portions corresponding to the different queues. The different queues 150 are thus created in correlation with the key (which may be referred to herein as a "locality" key or "sharding" key). Every data record should therefore be associate with such a key.

Worker entities monitor the queues to identify the optimal time to process the queue. For example, as discussed in more detail below, a signal to drain a queue may correlate to either a size threshold and/or a time threshold being met by the contents of a queue.

There may be a plurality of individual worker entities 108a, 108b, . . . 108n within a pool 106 of workers. Each worker entity corresponds to a type of entity that is capable of performing work in the system. In some embodiments, the worker entity corresponds to a thread (the term "worker thread" is used herein by way of example to refer to workers in the system). It is noted, however, that the workers could be implemented as any type of entity within a system that is capable of performing work. Examples of such processing entities include computer processes, threads, tasks, virtual machines, containers, pods, slaves, slave processes, computing nodes/devices (e.g., separate/individual/distributed computing nodes/stations), and/or any other type of hardware, software, or combination thereof that is capable of processing computing work.

A connection pool 132 may be maintained that is accessible by the workers entities. The connection pool may include one or more connections to each of the shards. For example, connections 134a and 134b are connections within the connection pool 132 that are constructed to connect to shard A. Connections 134c and 134d are connections within the connection pool 132 that are constructed to connect to shard B.

A worker thread processes the queue by sending the records to the relevant database node based on the locality. To do so, a topology of the database is maintained (e.g., in a routing table that maps locality keys to nodes/shards/partitions). This allows the worker to know which node the records should be sent based on the locality key. When the worker needs to send data to a specific shard, it will acquire a free connection from the connection pool for the node hosting the shard of interest.

The records are sent using a fast data transfer protocol. As discussed in more detail below, the fast data transfer protocol (a) performs group insertion of records into a database and (b) bypasses the SQL engine to write on the disk directly.

This system therefore provides a very efficient approach to perform high volume data ingestion into a relational database. By implementing a middle tier having the above-described functionality, this completely eliminates the need to have large numbers of data producers each connecting to the data base with their own individual connections and performing their own sets of functionality to insert data into the database. Instead, by collecting data from multiple data producers together into the same middle tier, the data intended for a given partition/shard can be organized into a grouped size that is optimal for transfer into the database. Moreover, by having the middle-tier use a connection pool, this means that individual connections within the pool can be shared and acquired by worker entities as needed to perform the data loading into the database for all of the data produced by the data producers. This greatly improves the efficiency at which communications resources are consumed within the system, and allows the ingestion process to be scaled for very large volumes of data produces and generated data. At the back-end database system, the fast data transfer protocol further optimizes the speed and efficiency for the ingestion process.

Figure 2:
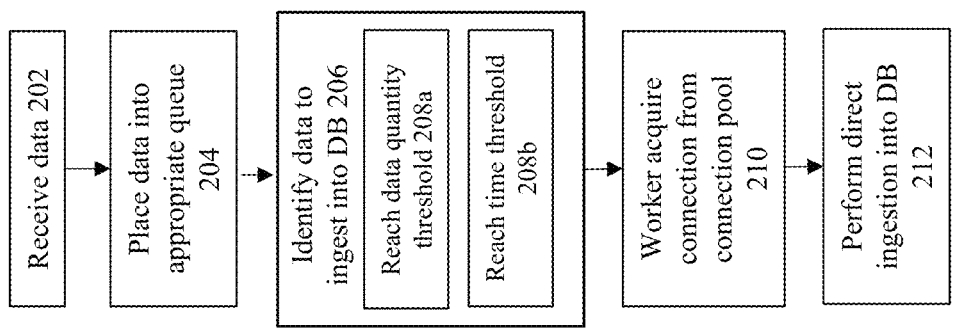
FIG. 2 provides a flowchart of an approach to implements some embodiments of the invention.

FIG. 2 shows a flowchart of an approach to implement some embodiments of the invention. At 202, data is received at the middle that was produced by the data producers. The data is organized at a middle tier location for ingestion into a database system. As stated above, the data producers may correspond to one or more IoT devices or systems that generate data records. At 204, the data is placed into the appropriate queue at the middle tier. The data record is used to split that incoming data records into the specific queue that is appropriate for that data records, e.g., based upon a given partition/shard to which that data record belongs. In some embodiments, the basic unit of scale when working with a stream is a shard, where individual records are the units of data stored in a stream. Partition keys may be employed to identify different shards in a stream. In some embodiments, a single shard is capable of ingesting a high volume of data, e.g., in some embodiments up to 1 MB or 1,000 PUTs per second of streaming data, and emitting data at a rate of 2 MB per second. In some embodiments, shards can be dynamically added or removed from a stream.

At 206, one or more sets of data are identified for ingestion into the database. This may occur, for example at step 208a, if a data quantity threshold is reached, e.g., when a queue fills up. The size threshold may be selected to correspond to an optimal data size for a uniform unit of communications/data transfer between the middle tier and the database. As another example, at step 208b, a time threshold may be reached. This may be configured such that if no new data is received for a given queue within a certain time period, then the queue is processed for database ingestion. However, if any new records are continued to be received, then the timer restarts for the time threshold. Both of these techniques may be in conjunction with one another. For example, even if the time threshold is not reached, the size threshold may cause the queue to be drained. Similarly, even if the size threshold is not reached, the time threshold may cause the queue to be drained. It is noted that either/both the time threshold and the size threshold may be configurable and/or adaptable. For example, the size threshold for the queue may be configurable to be either larger or smaller depending upon the amount of available memory that exists in the system. In some embodiments, the size threshold may therefore be dynamically adjustable to account for fluctuations in the memory usage of the system. Similarly, the time threshold may be configurable based upon the application of learning algorithms (e.g., using machine learning techniques) that adapts the time threshold to optically reduce unnecessary wait times to drain the queues.

At 210, a worker from a work pool is selected to process the queue to be ingested. The worker will acquire an appropriate connection from the connection pool, e.g., based upon matching the locality key for the data record within the queue being processed against the entries in a routing table. In some embodiments, separate workers may be employed to handle different stages of the processing of the work, e.g., where a first worker thread processes data records for the queues and a second worker thread acquires a connection from the connection pool for communication of data to the database.

At this point, at 212, a direct path ingestion is performed into the database to implement a fast data transfer protocol with the database. The fast data transfer protocol bypasses the SQL engine on the RDBMS to write on the disk directly. This technique operates by directly creating the storage representation (e.g., blocks/files to be placed on-disk) of the data to be ingested into the database. For example, if the ingestion is adding n number of rows to a table, then instead of individually invoking SQL operations to add those rows, the protocol instead directly formats the block(s) appropriate for those new database table rows and appends those blocks to the data file(s) for the modified table.

Figure 3:
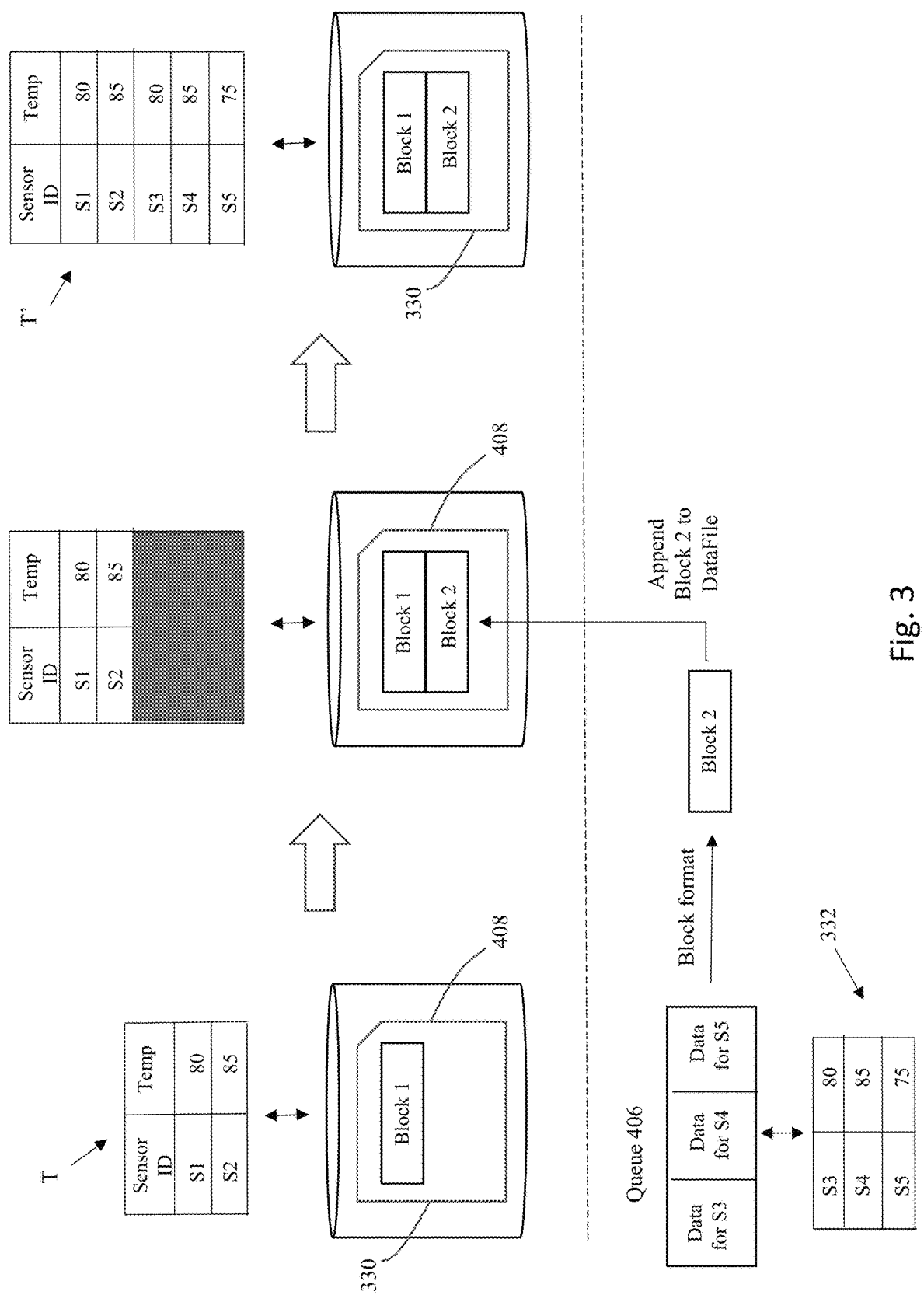
FIG. 3 illustrates a fast data transfer protocol that bypasses the SQL engine to write on the disk directly.

FIG. 3 illustrates this approach to perform direct path ingestion according to some embodiments of the invention. Here, the starting point of a table T in the database comprises two rows corresponding to data records previously acquired from sensors S1 and S2. This table T is represented in a storage device as a datafile 330. Datafile 330 includes a block 1 that holds the actual data for the two rows currently within table T.

Assume that at a middle-tier, a queue 406 exists which includes new data records ready to be ingested into the database. In particular the queue 406 includes data records corresponding to new sensor readings for sensors S3, S4, and S5. Further assume that this queue is ready for ingestion into the DB, e.g., because either a size threshold and/or a time threshold has been reached.

The fast data transfer protocol can be used to efficiently transfer the data in queue 406 into the database. Here, the data records within queue 406, when it is eventually placed into table T, will includes a set of three rows, e.g., rows 332. Instead of performing a one-by-one insertion of those rows into the table T, the data corresponding to rows 332 are bundled together as a single group of data. The data for rows 332 is formatted into the appropriate block format so that a new block (block 2) is constructed that corresponds to rows 332. At the RDBMS, that new block 2 is then added to the datafile 330, e.g., by appending new block 2 to the existing block 1. At this point, by performing this inclusion of block 2 into the datafile, this completely avoids the need to individually process each data record separately. Moreover, this approach bypasses standard SQL transactional processing, e.g., by avoiding operations such as generation of individual redo records for each row insertion. The final result is a revised table T' that now includes the new rows, where the rows were inserted in a manner that is more efficient and which bypassed standard SQL processing.

It is noted that some embodiments may still perform database logging on a batch basis, even if the logging is not performed on a row-by-row basis since the SQL processing engine has been bypassed. For example, to be able to back out of uncommitted changes in the event of an error or failure, one or more undo records may be created that describes how to undo changes made by the operations implemented using the fast data transfer protocol.

Figure 4:
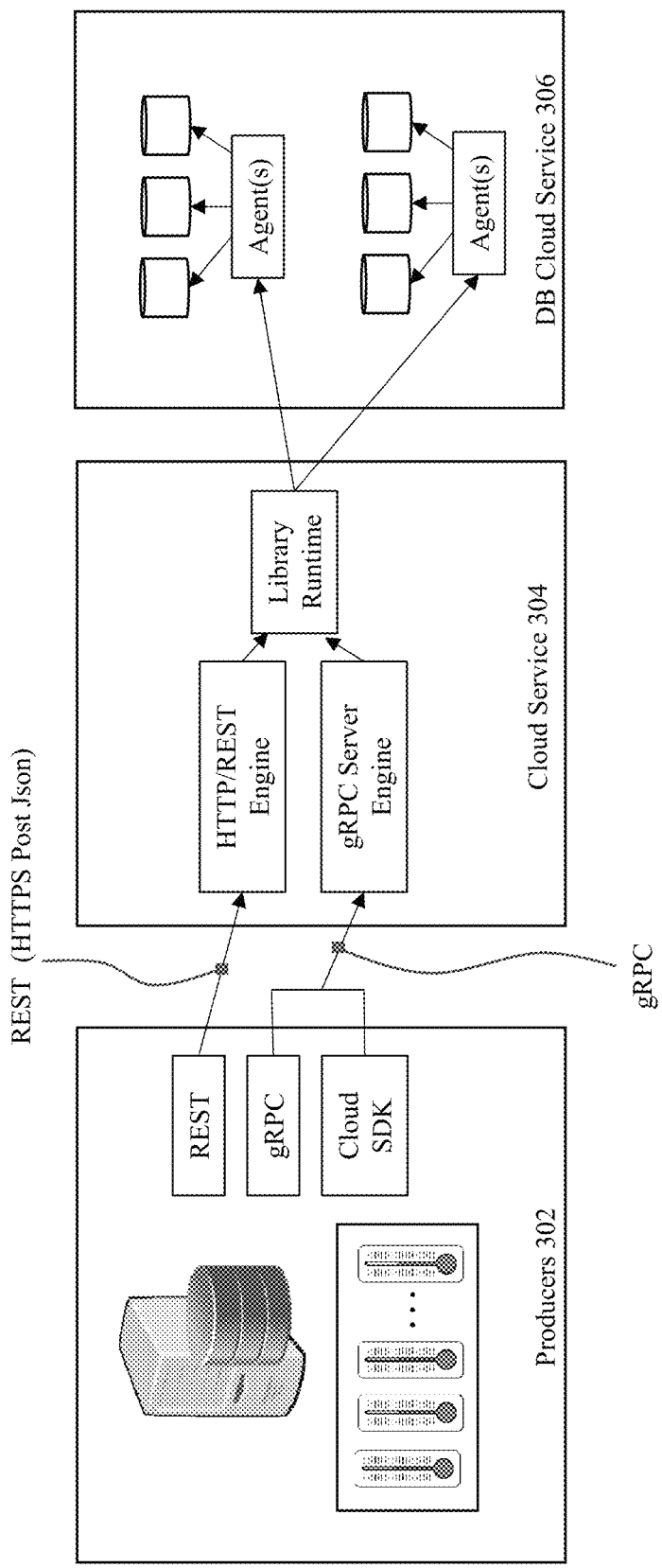
FIG. 4 illustrates an embodiment that provides a cloud service architecture.

FIG. 4 discloses a more detailed illustration of an approach to implement some embodiments of the invention, where the system architecture includes data producers 302, a cloud service 304, and a database cloud service 306. This figure illustrates some of the internal implementing details to provide a cloud architecture to address the use case when a large number of clients use the database to persist large amount of records (in the form of table rows), and where blocking is avoided that minimizes waiting for a synchronous response from the database (e.g., based upon network/roundtrip overhead to process each database update).

This cloud architecture provides an operational and an administrative interface that allows users to use the service through industry standards and to abstract from the complexities of the ingestion. In addition, this approach provides an architecture for the library to run in a context of high availability, disaster recovery, and permits elastic growth over changing resource demands.

In some embodiments, the cloud service provides the following channels to ingest data into the Database: (a) Google Remote Procedure Call (gRPC); (b) a cloud software development kit (SDK): built on top of the gRPC interface; (c) Representational State Transfer (REST), which is a standard for RPC; (d) one or more Agent(s), which can be implemented as a standalone Java process/listener to load text files.

A library (e.g., a Java library) is provided that facilitates efficient streaming of data (rows/records) into the relational database. IoT agents or Telco applications that need to persist large amount of records in the form of rows in a table in the database will consume this library. In an example use case, a large number of clients (e.g., IoT agents) use the database to persist information in the form of table rows and do not want to be blocked waiting for a synchronous response from the database (streaming). The library exposes a set of Java APIs to achieve this goal. These APIs can be consumed directly by monitoring agents. The library relies on the Universal Connection Pool (UCP) for connection pooling/management and a (Two-Task Common) TTC library to provide the translation between user data and the database network protocol.

The library may include some or all of the following: (a) a core library that has the responsibility to expose the API to handle the logic to persist the user information in the database. It uses UCP for connection pooling/management, including sharding topology knowledge and Fast Application Notification (FAN) awareness for a clustered database. (b) a JDBC thin driver is provided, which may be implemented as internal APIs for direct path loading; (c) a library to implement the fast transfer protol, which has the main task to handle user data, and to create the requests to insert data in the database, including direct path; (d) a UCP (universal connection pool) library, which extracts the sharding topology for a sharded database and listen for FAN events.

The library operates by recognizing the sharding keys specified by the users and allow them to connect to the specific shard and chunk. As new connections are created, the sharding-key ranges are cached to the location of the shard and allows further connection request to bypass a shard director, thereby allowing faster path key access. The UCP can also select an available connection in the pool just by providing sharding keys; this allows re-usage of connections to various shards by using the cached routing topology. The library uses the sharding APIs exposed by UCP to obtain a proper connection for the given sharding key. Each record in library can be mapped to a specific unique ID and then these records can be grouped together using unique ID. When the library has enough records to send to the database, it borrows a specific connection from UCP and uses that connection to insert the records into the sharded database.

Therefore, what has been provided is an improved approach to implement high-volume data ingestion into a relational database. The approach queues and organizes records inside the library's buffer based on their data locality or shard. Worker threads (or tasks, processes, or other processing entities) are used to send the queues of records to the relevant database destination. A data protocol is then employed that by-passes the SQL engine on the RDBMS side. With these techniques, the inventive concept can achieve very high volume (e.g., many millions records per second) on one computing node.

System Architecture Overview

Figure 5:
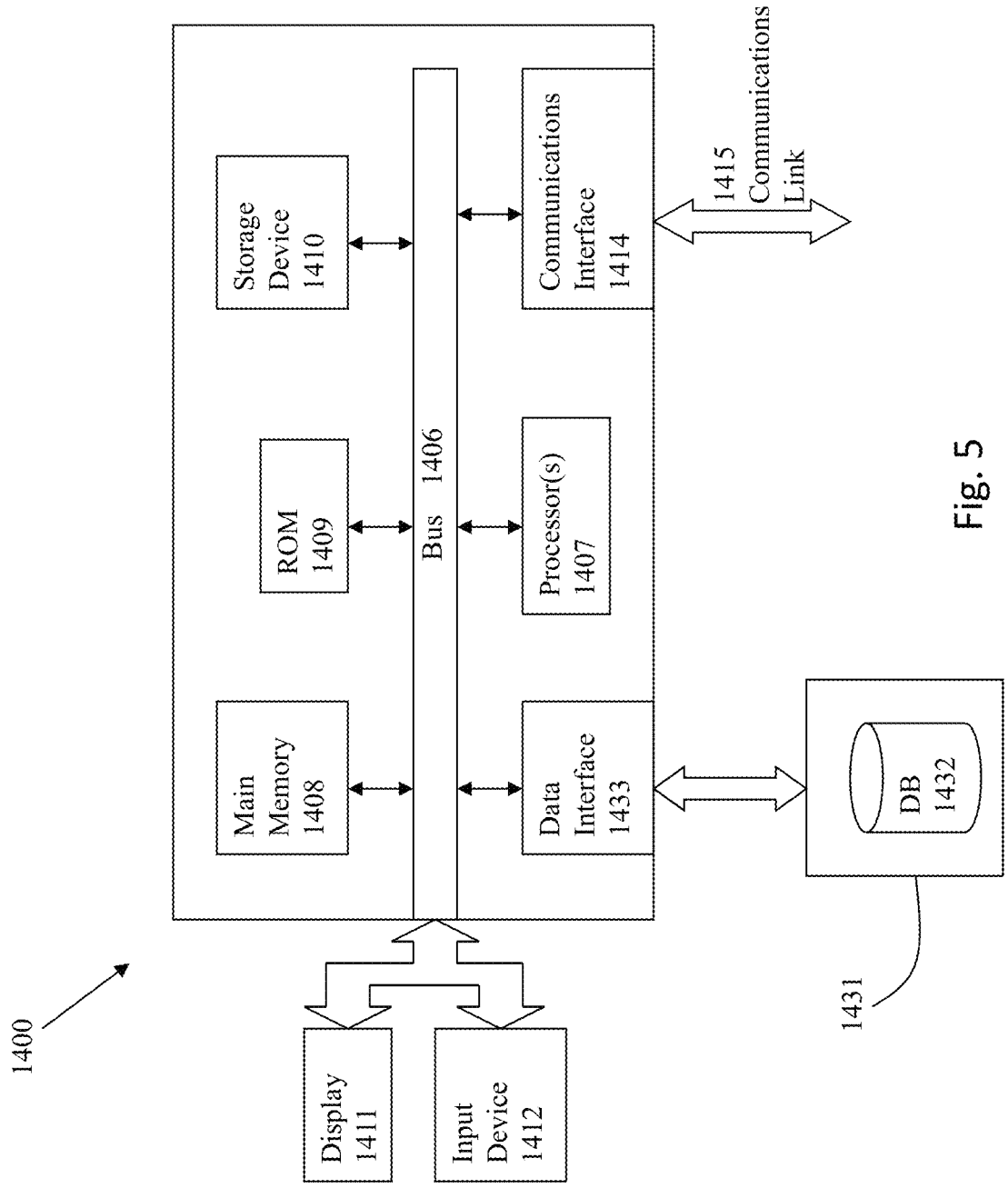
FIG. 5 is a block diagram of an illustrative computing system suitable for implementing an embodiment of the present invention.

FIG. 5 is a block diagram of an illustrative computing system 1400 suitable for implementing an embodiment of the present invention. Computer system 1400 includes a bus 1406 or other communication mechanism for communicating information, which interconnects subsystems and devices, such as processor 1407, system memory 1408 (e.g., RAM), static storage device 1409 (e.g., ROM), disk drive 1410 (e.g., magnetic or optical), communication interface 1414 (e.g., modem or Ethernet card), display 1411 (e.g., CRT or LCD), input device 1412 (e.g., keyboard), and cursor control.

According to one embodiment of the invention, computer system 1400 performs specific operations by processor 1407 executing one or more sequences of one or more instructions contained in system memory 1408. Such instructions may be read into system memory 1408 from another computer readable/usable medium, such as static storage device 1409 or disk drive 1410. In alternative embodiments, hard-wired circuitry may be used in place of or in combination with software instructions to implement the invention. Thus, embodiments of the invention are not limited to any specific combination of hardware circuitry and/or software. In one embodiment, the term "logic" shall mean any combination of software or hardware that is used to implement all or part of the invention.

The term "computer readable medium" or "computer usable medium" as used herein refers to any medium that participates in providing instructions to processor 1407 for execution. Such a medium may take many forms, including but not limited to, non-volatile media and volatile media. Non-volatile media includes, for example, optical or magnetic disks, such as disk drive 1410. Volatile media includes dynamic memory, such as system memory 1408.

Common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, cloud-based storage, or any other medium from which a computer can read.

In an embodiment of the invention, execution of the sequences of instructions to practice the invention is performed by a single computer system 1400. According to other embodiments of the invention, two or more computer systems 1400 coupled by communication link 1415 (e.g., LAN, PTSN, or wireless network) may perform the sequence of instructions required to practice the invention in coordination with one another.

Computer system 1400 may transmit and receive messages, data, and instructions, including program, i.e., application code, through communication link 1415 and communication interface 1414. Received program code may be executed by processor 1407 as it is received, and/or stored in disk drive 1410, or other non-volatile storage for later execution. Data may be accessed from a database 1432 that is maintained in a storage device 1431, which is accessed using data interface 1433.

Figure 6:
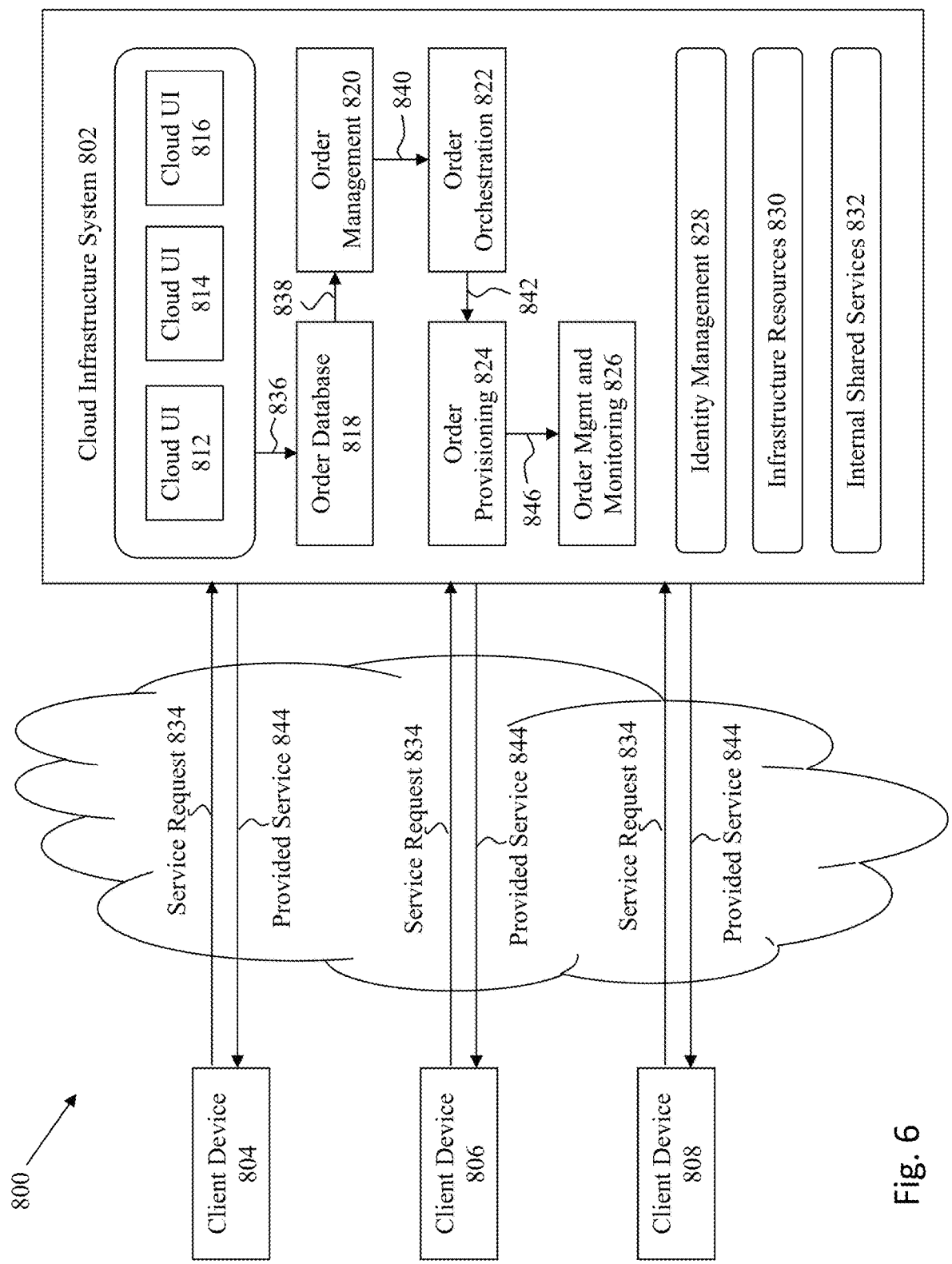
FIG. 6 is a block diagram of one or more components of a system environment in which services may be offered as cloud services, in accordance with an embodiment of the present invention.

FIG. 6 is a simplified block diagram of one or more components of a system environment 800 by which services provided by one or more components of an embodiment provided system may be offered as cloud services, in accordance with an embodiment of the present disclosure. In the illustrated embodiment, system environment 800 includes one or more client computing devices 804, 806, and 808 that may be used by users to interact with a cloud infrastructure system 802 that provides cloud services. The client computing devices may be configured to operate a client application such as a web browser, a proprietary client application, or some other application, which may be used by a user of the client computing device to interact with cloud infrastructure system 802 to use services provided by cloud infrastructure system 802.

It should be appreciated that cloud infrastructure system 802 depicted in the figure may have other components than those depicted. Further, the embodiment shown in the figure is only one example of a cloud infrastructure system that may incorporate an embodiment of the invention. In some other embodiments, cloud infrastructure system 802 may have more or fewer components than shown in the figure, may combine two or more components, or may have a different configuration or arrangement of components. Client computing devices 804, 806, and 808 may be devices similar to those described above for FIG. 5. Although system environment 800 is shown with three client computing devices, any number of client computing devices may be supported. Other devices such as devices with sensors, etc. may interact with cloud infrastructure system 802.

Network(s) 810 may facilitate communications and exchange of data between clients 804, 806, and 808 and cloud infrastructure system 802. Each network may be any type of network familiar to those skilled in the art that can support data communications using any of a variety of commercially-available protocols. Cloud infrastructure system 802 may comprise one or more computers and/or servers.

In certain embodiments, services provided by the cloud infrastructure system may include a host of services that are made available to users of the cloud infrastructure system on demand, such as online data storage and backup solutions, Web-based e-mail services, hosted office suites and document collaboration services, database processing, managed technical support services, and the like. Services provided by the cloud infrastructure system can dynamically scale to meet the needs of its users. A specific instantiation of a service provided by cloud infrastructure system is referred to herein as a "service instance." In general, any service made available to a user via a communication network, such as the Internet, from a cloud service provider's system is referred to as a "cloud service." Typically, in a public cloud environment, servers and systems that make up the cloud service provider's system are different from the customer's own on-premises servers and systems. For example, a cloud service provider's system may host an application, and a user may, via a communication network such as the Internet, on demand, order and use the application.

In some examples, a service in a computer network cloud infrastructure may include protected computer network access to storage, a hosted database, a hosted web server, a software application, or other service provided by a cloud vendor to a user, or as otherwise known in the art. For example, a service can include password-protected access to remote storage on the cloud through the Internet. As another example, a service can include a web service-based hosted relational database and a script-language middleware engine for private use by a networked developer. As another example, a service can include access to an email software application hosted on a cloud vendor's web site.

In certain embodiments, cloud infrastructure system 802 may include a suite of applications, middleware, and database service offerings that are delivered to a customer in a self-service, subscription-based, elastically scalable, reliable, highly available, and secure manner.

In various embodiments, cloud infrastructure system 802 may be adapted to automatically provision, manage and track a customer's subscription to services offered by cloud infrastructure system 802. Cloud infrastructure system 802 may provide the cloudservices via different deployment models. For example, services may be provided under a public cloud model in which cloud infrastructure system 802 is owned by an organization selling cloud services and the services are made available to the general public or different industry enterprises. As another example, services may be provided under a private cloud model in which cloud infrastructure system 802 is operated solely for a single organization and may provide services for one or more entities within the organization. The cloud services may also be provided under a community cloud model in which cloud infrastructure system 802 and the services provided by cloud infrastructure system 802 are shared by several organizations in a related community. The cloud services may also be provided under a hybrid cloud model, which is a combination of two or more different models.

In some embodiments, the services provided by cloud infrastructure system 802 may include one or more services provided under Software as a Service (SaaS) category, Platform as a Service (PaaS) category, Infrastructure as a Service (IaaS) category, or other categories of services including hybrid services. A customer, via a subscription order, may order one or more services provided by cloud infrastructure system 802. Cloud infrastructure system 802 then performs processing to provide the services in the customer's subscription order.

In some embodiments, the services provided by cloud infrastructure system 802 may include, without limitation, application services, platform services and infrastructure services. In some examples, application services may be provided by the cloud infrastructure system via a SaaS platform. The SaaS platform may be configured to provide cloud services that fall under the SaaS category. For example, the SaaS platform may provide capabilities to build and deliver a suite of on-demand applications on an integrated development and deployment platform. The SaaS platform may manage and control the underlying software and infrastructure for providing the SaaS services. By utilizing the services provided by the SaaS platform, customers can utilize applications executing on the cloud infrastructure system. Customers can acquire the application services without the need for customers to purchase separate licenses and support. Various different SaaS services may be provided. Examples include, without limitation, services that provide solutions for sales performance management, enterprise integration, and business flexibility for large organizations.

In some embodiments, platform services may be provided by the cloud infrastructure system via a PaaS platform. The PaaS platform may be configured to provide cloud services that fall under the PaaS category. Examples of platform services may include without limitation services that enable organizations to consolidate existing applications on a shared, common architecture, as well as the ability to build new applications that leverage the shared services provided by the platform. The PaaS platform may manage and control the underlying software and infrastructure for providing the PaaS services. Customers can acquire the PaaS services provided by the cloud infrastructure system without the need for customers to purchase separate licenses and support.

By utilizing the services provided by the PaaS platform, customers can employ programming languages and tools supported by the cloud infrastructure system and also control the deployed services. In some embodiments, platform services provided by the cloud infrastructure system may include database cloud services, middleware cloud services, and Java cloud services. In one embodiment, database cloud services may support shared service deployment models that enable organizations to pool database resources and offer customers a Database as a Service in the form of a database cloud. Middleware cloud services may provide a platform for customers to develop and deploy various business applications, and Java cloudservices may provide a platform for customers to deploy Java applications, in the cloud infrastructure system.

Various different infrastructure services may be provided by an IaaS platform in the cloud infrastructure system. The infrastructure services facilitate the management and control of the underlying computing resources, such as storage, networks, and other fundamental computing resources for customers utilizing services provided by the SaaS platform and the PaaS platform.

In certain embodiments, cloud infrastructure system 802 may also include infrastructure resources 830 for providing the resources used to provide various services to customers of the cloud infrastructure system. In one embodiment, infrastructure resources 830 may include pre-integrated and optimized combinations of hardware, such as servers, storage, and networking resources to execute the services provided by the PaaS platform and the SaaS platform.

In some embodiments, resources in cloud infrastructure system 802 may be shared by multiple users and dynamically re-allocated per demand. Additionally, resources may be allocated to users in different time zones. For example, cloud infrastructure system 830 may enable a first set of users in a first time zone to utilize resources of the cloud infrastructure system for a specified number of hours and then enable the re-allocation of the same resources to another set of users located in a different time zone, thereby maximizing the utilization of resources.

In certain embodiments, a number of internal shared services 832 may be provided that are shared by different components or modules of cloud infrastructure system 802 and by the services provided by cloud infrastructure system 802. These internal shared services may include, without limitation, a security and identity service, an integration service, an enterprise repository service, an enterprise manager service, a virus scanning and white list service, a high availability, backup and recovery service, service for enabling cloud support, an email service, a notification service, a file transfer service, and the like.

In certain embodiments, cloud infrastructure system 802 may provide comprehensive management of cloud services (e.g., SaaS, PaaS, and IaaS services) in the cloud infrastructure system. In one embodiment, cloud management functionality may include capabilities for provisioning, managing and tracking a customer's subscription received by cloud infrastructure system 802, and the like.

In one embodiment, as depicted in the figure, cloud management functionality may be provided by one or more modules, such as an order management module 820, an order orchestration module 822, an order provisioning module 824, an order management and monitoring module 826, and an identity management module 828. These modules may include or be provided using one or more computers and/or servers, which may be general purpose computers, specialized server computers, server farms, server clusters, or any other appropriate arrangement and/or combination.

In operation 834, a customer using a client device, such as client device 804, 806 or 808, may interact with cloud infrastructure system 802 by requesting one or more services provided by cloud infrastructure system 802 and placing an order for a subscription for one or more services offered by cloud infrastructure system 802. In certain embodiments, the customer may access a cloud User Interface (UI), cloud UI 812, cloud UI 814 and/or cloud UI 816 and place a subscription order via these UIs. The order information received by cloud infrastructure system 802 in response to the customer placing an order may include information identifying the customer and one or more services offered by the cloud infrastructure system 802 that the customer intends to subscribe to.

After an order has been placed by the customer, the order information is received via the cloud UIs, 812, 814 and/or 816. At operation 836, the order is stored in order database 818. Order database 818 can be one of several databases operated by cloud infrastructure system 818 and operated in conjunction with other system elements. At operation 838, the order information is forwarded to an order management module 820. In some instances, order management module 820 may be configured to perform billing and accounting functions related to the order, such as verifying the order, and upon verification, booking the order. At operation 840, information regarding the order is communicated to an order orchestration module 822. Order orchestration module 822 may utilize the order information to orchestrate the provisioning of services and resources for the order placed by the customer. In some instances, order orchestration module 822 may orchestrate the provisioning of resources to support the subscribed services using the services of order provisioning module 824.

In certain embodiments, order orchestration module 822 enables the management of business processes associated with each order and applies business logic to determine whether an order should proceed to provisioning. At operation 842, upon receiving an order for a new subscription, order orchestration module 822 sends a request to order provisioning module 824 to allocate resources and configure those resources needed to fulfill the subscription order. Order provisioning module 824 enables the allocation of resources for the services ordered by the customer. Order provisioning module 824 provides a level of abstraction between the cloud services provided by cloud infrastructure system 802 and the physical implementation layer that is used to provision the resources for providing the requested services. Order orchestration module 822 may thus be isolated from implementation details, such as whether or not services and resources are actually provisioned on the fly or pre-provisioned and only allocated/assigned upon request.

At operation 844, once the services and resources are provisioned, a notification of the provided service may be sent to customers on client devices 804, 806 and/or 808 by order provisioning module 824 of cloud infrastructure system 802.

At operation 846, the customer's subscription order may be managed and tracked by an order management and monitoring module 826. In some instances, order management and monitoring module 826 may be configured to collect usage statistics for the services in the subscription order, such as the amount of storage used, the amount data transferred, the number of users, and the amount of system up time and system down time.

In certain embodiments, cloud infrastructure system 802 may include an identity management module 828. Identity management module 828 may be configured to provide identity services, such as access management and authorization services in cloud infrastructure system 802. In some embodiments, identity management module 828 may control information about customers who wish to utilize the services provided by cloud infrastructure system 802. Such information can include information that authenticates the identities of such customers and information that describes which actions those customers are authorized to perform relative to various system resources (e.g., files, directories, applications, communication ports, memory segments, etc.) Identity management module 828 may also include the management of descriptive information about each customer and about how and by whom that descriptive information can be accessed and modified.

In the foregoing specification, the invention has been described with reference to specific embodiments thereof. It will, however, be evident that various modifications and changes may be made thereto without departing from the broader spirit and scope of the invention. For example, the above-described process flows are described with reference to a particular ordering of process actions. However, the ordering of many of the described process actions may be changed without affecting the scope or operation of the invention. The specification and drawings are, accordingly, to be regarded in an illustrative rather than restrictive sense. In addition, an illustrated embodiment need not have all the aspects or advantages shown. An aspect or an advantage described in conjunction with a particular embodiment is not necessarily limited to that embodiment and can be practiced in any other embodiments even if not so illustrated. Also, reference throughout this specification to "some embodiments" or "other embodiments" means that a particular feature, structure, material, or characteristic described in connection with the embodiments is included in at least one embodiment. Thus, the appearances of the phrase "in some embodiment" or "in other embodiments" in various places throughout this specification are not necessarily referring to the same embodiment or embodiments.

What is claimed is:

1. A method for implementing high-volume ingestion of data into a relational database system, comprising:
    implementing a database architecture having a middle tier server that is located between data producers and a relational database management system (RDBMS);
    maintaining one or more queues at the middle tier server, wherein data records generated by the data producers are placed into the one or more queues;
    identifying a set of data within the one or more queues for ingestion into the RDBMS;
    acquiring a connection from a connection pool to process the set of data;
    transferring the set of data to the RDBMS with the connection acquired from the connection pool; and
    inserting the set of data into a table within the RDBMS with a bypass of a SQL processing engine.

2. The method of claim 1, wherein the RDBMS comprises a sharded database, the one or more queues comprises a first queue that corresponds to a first shard and a second queue that corresponds to a second shard, wherein a first data record generated by the data producers that corresponds to the first shard is placed into the first queue, and a second data record generated by the data producers that corresponds to the second shard is placed into the second queue.

3. The method of claim 2, wherein a shard in the sharded database comprises a plurality of partitions, the first queue corresponds to a first partition in the first shard and the second queue corresponds to a second partition in the second shard, wherein the first data record generated by the data producers that corresponds to the first partition in the first shard is placed into the first queue, and the second data record generated by the data producers that corresponds to the second partition in the second shard is placed into the second queue.

4. The method of claim 3, wherein the first data record is associated with a key that corresponds to the first partition in the first shard, wherein the key identifies the first queue as corresponding to the first data record.

5. The method of claim 3, wherein the first data record is associated with a key that corresponds to the first partition in the first shard, wherein the key is used as a locality key that identifies an entry in a routing table to acquire the connection from the connection pool appropriate for the first shard.

6. The method of claim 1, wherein the set of data within the one or more queues is identified for ingestion into the RDBMS by determining that a volume of data within a queue has reached a size threshold.

7. The method of claim 1, wherein the set of data within the one or more queues is identified for ingestion into the RDBMS by determining that a time threshold has been reached for the data records within a queue.

8. The method of claim 1, wherein the set of data is inserted into the table within the RDBMS by formatting a new data block that includes the set of data, and placing the new data block into a datafile corresponding to the table.

9. The method of claim 1, wherein the bypass of the SQL processing engine to insert the set of data into the table within the RDBMS is performed without generating log records on a row-by-row basis in the RDBMS.

10. A system for implementing high-volume ingestion of data into a relational database system, comprising:
a processor;
a memory for holding programmable code; and
wherein the programmable code includes instructions for implementing a database architecture having a middle tier server that is located between data producers and a relational database management system (RDBMS), maintaining one or more queues at the middle tier server, wherein data records generated by the data producers are placed into the one or more queues, identifying a set of data within the one or more queues for ingestion into the RDBMS, acquiring a connection from a connection pool to process the set of data, transferring the set of data to the RDBMS with the connection acquired from the connection pool, and inserting the set of data into a table within the RDBMS with a bypass of a SQL processing engine.

11. The system of claim 10, wherein the RDBMS comprises a sharded database, the one or more queues comprises a first queue that corresponds to a first shard and a second queue that corresponds to a second shard, wherein a first data record generated by the data producers that corresponds to the first shard is placed into the first queue, and a second data record generated by the data producers that corresponds to the second shard is placed into the second queue.

12. The system of claim 11, wherein a shard in the sharded database comprises a plurality of partitions, the first queue corresponds to a first partition in the first shard and the second queue corresponds to a second partition in the second shard, wherein the first data record generated by the data producers that corresponds to the first partition in the first shard is placed into the first queue, and the second data record generated by the data producers that corresponds to the second partition in the second shard is placed into the second queue.

13. The system of claim 12, wherein the first data record is associated with a key that corresponds to the first partition in the first shard, wherein the key identifies the first queue as corresponding to the first data record.

14. The system of claim 12, wherein the first data record is associated with a key that corresponds to the first partition in the first shard, wherein the key is used as a locality key that identifies an entry in a routing table to acquire the connection from the connection pool appropriate for the first shard.

15. The system of claim 10, wherein the set of data within the one or more queues is identified for ingestion into the RDBMS by determining that a volume of data within a queue has reached a size threshold.

16. The system of claim 10, wherein the set of data within the one or more queues is identified for ingestion into the RDBMS by determining that a time threshold has been reached for the data records within a queue.

17. The system of claim 10, wherein the set of data is inserted into the table within the RDBMS by formatting a new data block that includes the set of data, and placing the new data block into a datafile corresponding to the table.

18. The system of claim 10, wherein the bypass of the SQL processing engine to insert the set of data into the table within the RDBMS is performed without generating log records on a row-by-row basis in the RDBMS.

19. A computer program product embodied on a computer readable medium, the computer readable medium having stored thereon a sequence of instructions which, when executed by a processor, executes a method for implementing high-volume ingestion of data into a relational database system, comprising:
implementing a database architecture having a middle tier server that is located between data producers and a relational database management system (RDBMS);
maintaining one or more queues at the middle tier server, wherein data records generated by the data producers are placed into the one or more queues;
identifying a set of data within the one or more queues for ingestion into the RDBMS;
acquiring a connection from a connection pool to process the set of data;
transferring the set of data to the RDBMS with the connection acquired from the connection pool; and
inserting the set of data into a table within the RDBMS with a bypass of a SQL processing engine.

20. The computer program product of claim 19, wherein the RDBMS comprises a sharded database, the one or more queues comprises a first queue that corresponds to a first shard and a second queue that corresponds to a second shard, wherein a first data record generated by the data producers that corresponds to the first shard is placed into the first queue, and a second data record generated by the data producers that corresponds to the second shard is placed into the second queue.

21. The computer program product of claim 20, wherein a shard in the sharded database comprises a plurality of partitions, the first queue corresponds to a first partition in the first shard and the second queue corresponds to a second partition in the second shard, wherein the first data record generated by the data producers that corresponds to the first partition in the first shard is placed into the first queue, and the second data record generated by the data producers that corresponds to the second partition in the second shard is placed into the second queue.

22. The computer program product of claim 21, wherein the first data record is associated with a key that corresponds to the first partition in the first shard, wherein the key identifies the first queue as corresponding to the first data record.

23. The computer program product of claim 21, wherein the first data record is associated with a key that corresponds to the first partition in the first shard, wherein the key is used as a locality key that identifies an entry in a routing table to acquire the connection from the connection pool appropriate for the first shard.

24. The computer program product of claim 19, wherein the set of data within the one or more queues is identified for ingestion into the RDBMS by determining that a volume of data within a queue has reached a size threshold.

25. The computer program product of claim 19, wherein the set of data within the one or more queues is identified for ingestion into the RDBMS by determining that a time threshold has been reached for the data records within a queue.

26. The computer program product of claim 19, wherein the set of data is inserted into the table within the RDBMS by formatting a new data block that includes the set of data, and placing the new data block into a datafile corresponding to the table.

27. The computer program product of claim 19, wherein the bypass of the SQL processing engine to insert the set of data into the table within the RDBMS is performed without generating log records on a row-by-row basis in the RDBMS.

* * * * *

UNITED STATES PATENT AND TRADEMARK OFFICE
CERTIFICATE OF CORRECTION

PATENT NO. : 11,394,794 B2
APPLICATION NO. : 16/656486
DATED : July 19, 2022
INVENTOR(S) : De Lavarene et al.

It is certified that error appears in the above-identified patent and that said Letters Patent is hereby corrected as shown below:

In the Specification

In Column 8, Line 39, delete "protol," and insert -- protocol, --, therefor.

In Column 9, Line 52, delete "PTSN," and insert -- PSTN, --, therefor.

In Column 11, Line 10, delete "cloudservices" and insert -- cloud services --, therefor.

In Column 12, Line 15, delete "cloudservices" and insert -- cloud services --, therefor.

Signed and Sealed this
Twenty-seventh Day of December, 2022

Katherine Kelly Vidal
*Director of the United States Patent and Trademark Office*